(12) United States Patent
Ovadia et al.

(10) Patent No.: US 6,888,986 B2
(45) Date of Patent: May 3, 2005

(54) METHOD AND APPARATUS OF A SEMICONDUCTOR-BASED TUNABLE OPTICAL DISPERSION COMPENSATION SYSTEM WITH MULTIPLE SYSTEM WITH MULTIPLE CHANNELS

(75) Inventors: Shlomo Ovadia, San Jose, CA (US); Ansheng Liu, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 529 days.

(21) Appl. No.: 10/004,030

(22) Filed: Oct. 19, 2001

(65) Prior Publication Data

US 2003/0077037 A1 Apr. 24, 2003

(51) Int. Cl.$^7$ .................................................. G02B 6/34
(52) U.S. Cl. ........................ 385/37; 385/10; 385/24; 385/131; 398/81
(58) Field of Search ...................... 385/24, 31, 37, 385/123, 129–132, 10, 40; 398/84, 87, 81

(56) References Cited

U.S. PATENT DOCUMENTS 6,356,674 B1 * 3/2002 Davis et al. ................... 385/10
6,453,095 B2 * 9/2002 Feng et al. .................... 385/37

OTHER PUBLICATIONS

Erdogan, T., "Fiber Grating Spectra", *Journal of Lightwave Technology*, vol. 15, No. 8, pp. 1277–1294, Aug. 1997.
Hill, K. O., "Fiber Bragg Grating Technology Fundamentals and Overview", *Journal of Lightwave Technology*, vol. 15, No. 8, pp. 1263–1276, Aug. 1997.

Studenkov, P.V., "Asymmetric Twin–Waveguide 1.55–$\mu$m Wavelength Laser with a Distributed Bragg Reflector", *IEEE Photonics Technology Letters*, vol. 12, No. 5, pp. 468–470, May 2000.

Willner, A.E., "Tunable Compensation of Channel Degrading Effects Using Nonlinearly Chirped Passive Fiber Bragg Gratings", *IEEE Journals of Selected Topics in Quantum Electronics*, vol. 5, No. 5, pp. 1298–1311, Sep./Oct. 1999.

Giles, C.R., "Lightwave Applications of Fiber Bragg Gratings", *Journal of Lightwave Technology*, vol. 15, No. 8, pp. 1391–1404, Aug. 1997.

Sugden, K., "Fabrication and Characterization of Bandpass Filters Based on Concatenated Chirped Fiber Gratings", *Journal of Lightwave Technology*, vol. 15, No. 8, pp. 1424–1432, Aug. 1997.

* cited by examiner

*Primary Examiner*—Hemang Sanghavi
(74) *Attorney, Agent, or Firm*—Glen B. Choi (57) ABSTRACT

A semiconductor-based tunable optical dispersion compensation method and apparatus for multiple channels. In one aspect of the present invention, an apparatus according to an embodiment of the present invention includes a semiconductor material. An optical path through the semiconductor material is included. The optical path is optically coupled to receive an optical beam. A nonlinearly chirped Bragg grating is disposed in the semiconductor material. The optical path includes the nonlinearly chirped Bragg grating to substantially reduce chromatic dispersion in the optical beam.

31 Claims, 6 Drawing Sheets

METHOD AND APPARATUS OF A SEMICONDUCTOR-BASED TUNABLE OPTICAL DISPERSION COMPENSATION SYSTEM WITH MULTIPLE SYSTEM WITH MULTIPLE CHANNELS

BACKGROUND OF THE INVENTION

1. Field of the Invention

The present invention relates generally to optical devices and, more specifically, the present invention relates to dispersion compensation devices.

2. Background Information

The need for fast and efficient optical-based technologies is increasing as the growth rate of Internet data traffic overtakes that of voice traffic, pushing the need for fiber optic communications. Transmission of multiple optical channels over the same fiber in a dense wavelength-division multiplexing (DWDM) system provides a simple way to use the unprecedented capacity (signal bandwidth) offered by fiber optics. Commonly used optical components in the system include wavelength-division multiplexing (WDM) transmitters and receivers, optical add/drop multiplexers, optical filters such as diffraction gratings, thin-film filters, fiber Bragg gratings, and arrayed-waveguide gratings.

It is well known that high-speed baseband optical signals are degraded when transmitted over single-mode fibers due to multiple effects such as chromatic dispersion and polarization mode dispersion. In order to extend the transmission distance of these signals, particularly in dynamically reconfigurable WDM systems, tunable dispersion compensation devices are utilized. Known tunable dispersion compensation devices are dispersion compensation fibers, which provide wavelength tuning, for example, by mechanically stretching nonlinearly chirped fiber Bragg gratings.

A fiber Bragg grating is an optical fiber device typically made of silica that is constructed by creating periodic changes in the refractive index of fiber core materials along the fiber length. These index changes may be formed by exposing the photosensitive core to intense optical interference patterns. With a nonlinearly chirped fiber Bragg grating, the fiber Bragg grating has a periodicity that varies nonlinearly along the length of the fiber and therefore produces a relative group delay that varies nonlinearly with the wavelength of light.

With nonlinearly chirped fiber Bragg grating, there is no dispersion tuning since at any particular wavelength of light, the grating-induced dispersion is substantially fixed. Nominal adjustments are made by physically or mechanically stretching the fiber with external mechanical stretchers such as piezoelectric transducers to modify the periodicity of the nonlinearly chirped fiber Bragg grating. A disadvantage with this technique is that the tuning range of the nonlinearly chirped fiber Bragg grating is relatively small and the fiber may suffer damage from the stress and strain induced by the physical stretching. In addition, high voltages in the order of ~1000 volts are necessary in order to operate piezoelectric transducers to physically stretch the fiber Bragg gratings. Another limitation with known dispersion compensation fibers is that insertion losses resulting from attenuation and/or coupling are generally very high. Consequently, optical power and budgets are adversely effected with the use of known dispersion compensation devices.

BRIEF DESCRIPTION OF THE DRAWINGS

The present invention is illustrated by way of example and not limitation in the accompanying figures.

DETAILED DESCRIPTION

Methods and apparatuses for a semiconductor-based tunable optical dispersion compensation system with multiple channels are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

As an overview of the various embodiments of the present invention, a semiconductor-based electronically controlled tunable dispersion compensation device is provided in a fully integrated solution on a single integrated circuit chip or semiconductor-based optical platform. As will be discussed herein, tunable dispersion compensation devices are provided with nonlinearly chirped Bragg gratings disposed in waveguides disposed in semiconductor materials. In the various embodiments, a Bragg condition of the nonlinearly chirped Bragg grating is tuned by adjusting an effective refractive index along the Bragg grating without making adjustments to the grating pitch of the Bragg grating.

Figure 1:
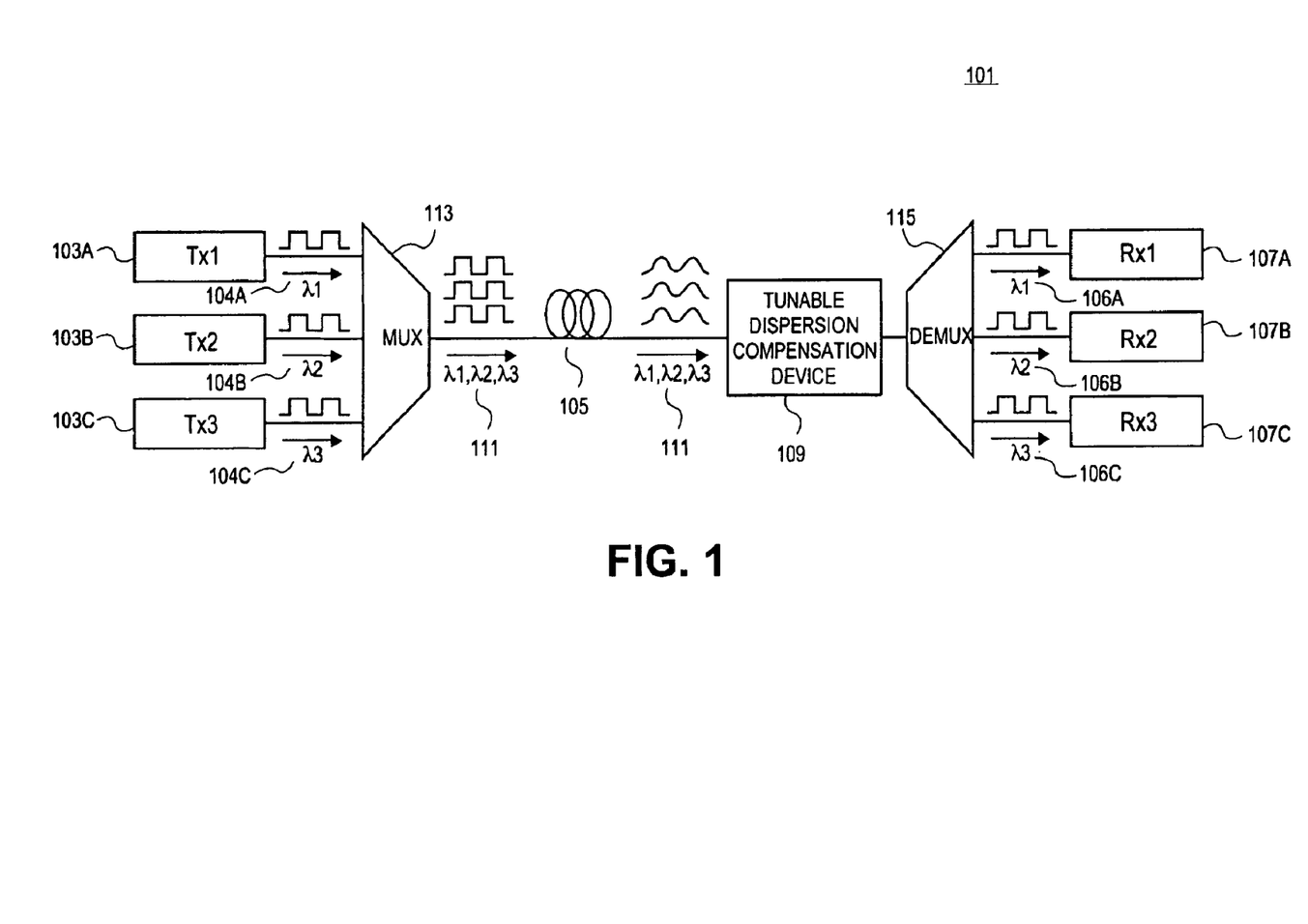
FIG. 1 is a block diagram illustrating an embodiment of an optical communication system including a tunable dispersion compensation device in accordance with the teachings of the present invention.

FIG. 1 is a block diagram illustrating generally one embodiment of an optical communication system 101 including an embodiment of a tunable dispersion compensation device 109 in accordance with the teachings of the present invention. As shown in the depicted embodiment, a plurality of optical devices 103A, 103B and 103C are optically coupled to a plurality of optical devices 107A, 107B and 107C through an optical fiber 105. In the illustrated example, it is appreciated that optical devices 103A, 103B and 103C have been illustrated in FIG. 1 as transmitters (i.e. Tx1, Tx2 and Tx3) and that the optical devices 107A, 107B and 107C have been illustrated as receivers (i.e. Rx1, Rx2 and Rx3) for explanation purposes. It is appreciated that optical devices 103A, 103B and 103C and 107A, 107B and 107C may be optical transceivers such that communications are bi-directional. In addition, it is appreciated that optical devices 103A, 103B and 103C may be an optical receivers and that optical devices 107A, 107B and 107C may be an optical transmitters in accordance with various embodiments of the present invention. In addition, it is noted that three transmitters and three receivers are illustrated in the example. It is appreciated that a greater or a few number of transmitters and/or receivers may be utilized in accordance with the teachings of the present invention.

As shown in the depicted embodiment, optical device 103A transmits an optical beam 104A, on which high-speed data is encoded on a channel having a wavelength $\lambda 1$. Optical device 103B transmits an optical beam 104B, on which high-speed data is encoded on a channel having a wavelength $\lambda 2$. Optical device 103C transmits an optical beam 104C, on which high-speed data is encoded on a channel having a wavelength $\lambda 3$. Optical beams 104A, 104B and 104C are received by a multiplexer 113, which outputs optical beam 111, which includes multiple channels having wavelengths $\lambda 1$, $\lambda 2$ and $\lambda 3$.

In one embodiment, the high-speed data from optical devices 103A, 103B and 103C are is encoded on the one or more wavelengths included in optical beam 111. In one embodiment, WDM, DWDM or similar techniques may be employed with optical beam 111 such that a different channel is encoded with each of the wavelengths included in optical beam 111. In one embodiment, the one or more channels or wavelengths included in optical beam 111 are centered in wavelength bands located at approximately 1310 or 1550 nanometers. In other embodiments, optical beam 111 includes other infrared or near infrared wavelengths in accordance with the teachings of the present invention. It is appreciated that although optical beam 111 is described in this example to include three wavelengths $\lambda 1$, $\lambda 2$ and $\lambda 3$, optical beam 111 may include a greater or fewer number of channels or wavelengths in accordance with the teachings of the present invention.

In one embodiment, optical beam 111 is transmitted from multiplexer 113 through an optical fiber 105 to demultiplexer 115. Demultiplexer 115 separates the channels or wavelengths $\lambda 1$, $\lambda 2$ and $\lambda 3$ of optical beam 111 and outputs optical beam 106A to optical device 107A, optical beam 106B to optical device 107B and optical beam 106C to optical device 107C. As shown in the depicted example, optical beam 106A has the wavelength $\lambda 1$, optical beam 106B has the wavelength $\lambda 2$ and optical beam 106C has the wavelength $\lambda 3$.

As illustrated in FIG. 1, as optical beam 111 propagates through optical fiber 105, optical channel-degrading effects occur in the data signals carried in optical beam 111 including chromatic dispersion effect accumulated in a single channel or multiple channels as well as other effects including for example polarization mode dispersion.

Consequently, the data signal encoded on optical beam 111 is degraded as shown in FIG. 1 after propagating through optical fiber 105 due to the optical channel degrading effects such chromatic dispersion.

As illustrated in FIG. 1, a tunable dispersion compensation device 109 is optically coupled to optical fiber 105 between multiplexer 113 and demultiplexer 115, or between the transmitters and receivers, to compensate for the chromatic dispersion. Accordingly, tunable dispersion compensation device 109 provides chromatic dispersion whose dispersion is of opposite sign and substantially equal to that of optical fiber 105 to substantially negate, minimize or eliminate the chromatic dispersion introduced by optical fiber 105. Thus, as shown in FIG. 1, the data signals carried in optical beam 111 are recovered at optical devices 107A, 107B and 107C as tunable dispersion compensation device 109 negates or substantially reduces the chromatic dispersion introduced by optical fiber 105.

In the example illustrated in FIG. 1, tunable dispersion compensation device 109 is located at the receiver end of optical system 101. It is appreciated that in other embodiments, tunable dispersion compensation device 109 may be positioned at other locations between optical devices 103A, 103B, 103C and 107A, 107B, 107C. For instance, in another embodiment, tunable dispersion compensation device 109 is located at the transmitter end of optical system 101 and is therefore, for example, coupled between optical fiber 105 and multiplexer 113, in accordance with the teachings of the present invention.

As will be discussed, tunable dispersion compensation device 109 substantially negates or reduces the chromatic dispersion introduced by optical fiber 105 by utilizing a semiconductor-based tunable nonlinearly chirped Bragg grating included in tunable dispersion compensation device 109. In one embodiment, the nonlinearly chirped Bragg grating included in tunable dispersion compensation device 109 is provided with a silicon-polysilicon grating disposed along a waveguide with spacing between the silicon and polysilicon regions having nonlinear periodicity. The dispersion compensation provided by the nonlinear chirped Bragg grating is tuned in one embodiment by adjusting the temperature of the Bragg grating with an adjustable heater. In another embodiment, the nonlinear chirped Bragg grating is provided with a silicon-polysilicon Bragg grating along a waveguide in a semiconductor material with a tunable nonlinear temperature gradient along the waveguide.

In yet another embodiment, the nonlinearly chirped Bragg grating of tunable dispersion compensation device 109 is provided with a plurality of charge modulated regions along a waveguide in a semiconductor material. In one embodiment, the plurality of charge modulated-regions are provided along the waveguide with a plurality of insulated electrodes disposed in the semiconductor material and distributed along the waveguide. The dispersion compensation provided by the nonlinearly-chirped Bragg grating is tuned in one embodiment by adjusting voltages having a nonlinear voltage gradient that are applied across the plurality of insulated electrodes. In another embodiment, the periodic spacing between the plurality of insulated electrodes in the semiconductor material has nonlinear periodicity.

In all the above embodiments, the dispersion compensating grating devices may include multiple semiconductor waveguide sections in the form, for example, of sampled gratings in order to provide independent dispersion tunings for multiple wavelengths as required in WDM or DWDM fiber optic communication systems. Sampled gratings are fabricated by creating a periodic modulation of the refractive index of the grating, generating a multiplicity of resonances, using a near ultra-violet light.

Figure 2:
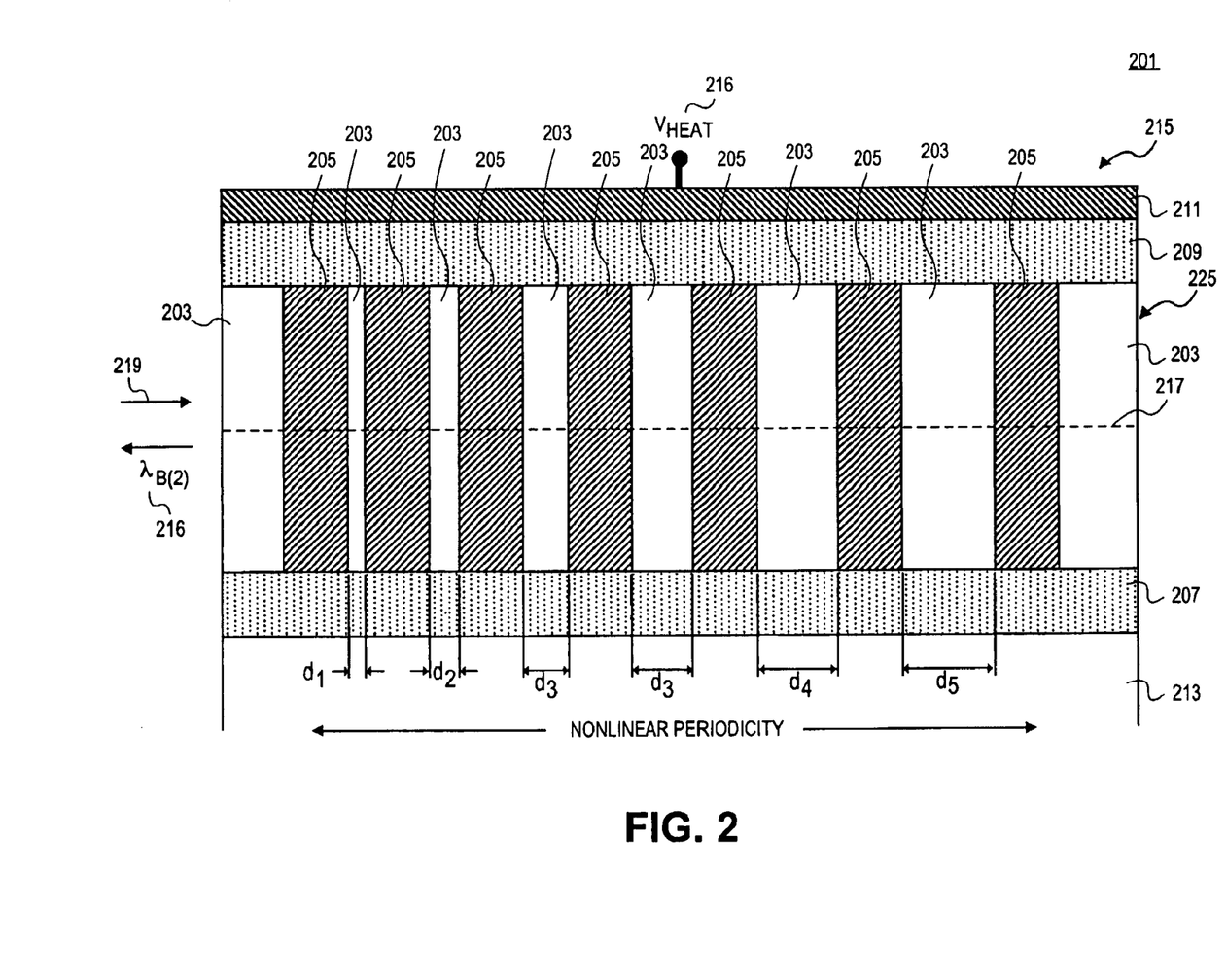
FIG. 2 is a block diagram illustrating a cross section of an embodiment of a nonlinearly chirped Bragg grating having nonlinear periodicity in a semiconductor material of a tunable dispersion compensation device in accordance with the teachings of the present invention.

To illustrate, FIG. 2 is a block diagram illustrating a cross section of one embodiment of a nonlinearly chirped Bragg grating 201 having nonlinear periodicity disposed in a semiconductor material 203 of a tunable dispersion compensation device in accordance with the teachings of the present invention. In one embodiment, nonlinearly chirped Bragg grating 201 is a sampled nonlinearly chirped Bragg grating and may be included in tunable dispersion compensation device 109 of FIG. 1. In the depicted embodiment, nonlinearly chirped Bragg grating 201 of FIG. 2 is silicon-polysilicon grating. It is appreciated that silicon and poly-silicon are example materials provided for explanation purposes and that other semiconductor materials including III–V semiconductor materials or the like may be utilized in accordance with the teachings of the present invention. As shown, a plurality of regions of polysilicon 205 are disposed in a silicon semiconductor material 203 such that periodic or quasi-periodic perturbations in an effective index of refraction $n_{eff}$ are provided along an optical path 217 through semiconductor material 203.

It is noted that nonlinearly chirped Bragg grating 201 has been illustrated in FIG. 2 with seven polysilicon 205 regions for explanation purposes. It is appreciated that in other embodiments, nonlinearly chirped Bragg grating 201 may include a greater or fewer number of polysilicon 205 regions in accordance with the teachings of the present invention.

In one embodiment in which silicon and polysilicon are utilized, having effective refractive indexes of $n_{Si}$ and $n_{poly}$, respectively, a small effective refractive index difference $\Delta n_{eff}$ (or $n_{poly}-n_{Si}$) is provided at each interface between semiconductor material 203 and polysilicon 205. In one embodiment, $\Delta n_{eff}$ is approximately within the range of 0.005 to 0.03. It is appreciated that other value ranges for $\Delta n_{eff}$ may be utilized in accordance with the teachings of the present invention and that 0.005 to 0.03 is provided herewith for explanation purposes.

As illustrated in FIG. 2, semiconductor material 203 is included in one embodiment in a silicon-on-insulator (SOI) wafer 215. As such, an insulating layer 207 or a buried oxide layer is disposed between semiconductor material 203 layer and another semiconductor material layer 213. In one embodiment, an additional insulating layer 209 is included such that semiconductor material 203 layer is disposed between insulating layers 207 and 209. In one embodiment, insulating layer 209 is an interlayer dielectric layer of the SOI wafer 215. In one embodiment, insulating layers 207 and 209 include an oxide material or the like. As a result, a waveguide 225 including optical path 217 is provided in semiconductor material 203 with cladding provided by insulating layers 207 and 209.

Figure 3:
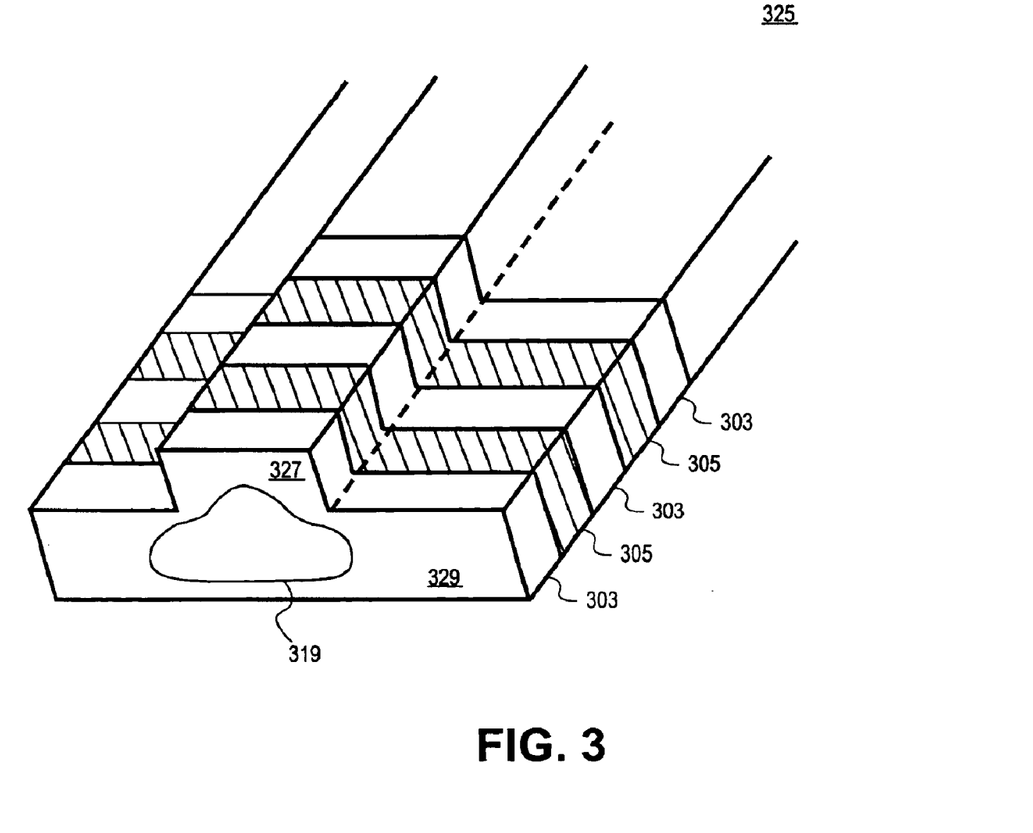
FIG. 3 is a perspective diagram illustrating an embodiment of a Bragg grating disposed in a semiconductor material including a rib waveguide disposed in a semiconductor material in accordance with the teachings of the present invention.

In one embodiment, waveguide 225 is a rib waveguide. To illustrate, FIG. 3 is a perspective view illustration of one embodiment of a rib waveguide 325 of a tunable Bragg grating in accordance with the teachings of the present invention. In one embodiment, rib waveguide 325 is disposed between insulating regions 207 and 209 of SOI wafer 215 of FIG. 2.

Referring back to FIG. 3, rib waveguide 325 is disposed in a semiconductor material 303 and includes regions of polysilicon 305. In one embodiment, the semiconductor material 303 has a different index of refraction than poly-silicon 305 such that periodic or quasi-periodic perturbations in an effective index of refraction are provided along an optical path through rib waveguide 325.

As shown, the rib waveguide 325 includes a rib region 327 and a slab region 329. In the embodiment illustrated in FIG. 3, the intensity distribution of a single mode optical beam 319 is shown propagating through the rib waveguide 325. As shown, the intensity distribution of optical beam 319 is such that of the majority of the optical beam 319 propagates through a portion of rib region 327 towards the interior of the rib waveguide 325. In addition, a portion of optical beam 319 propagates through a portion of slab region 329 towards the interior of the rib waveguide 325. As also shown with the intensity distribution of optical beam 319, the intensity of the propagating optical mode of beam 319 is vanishingly small at the "upper corners" of rib region 327 as well as the "sides" of slab region 329.

Referring back to the illustration in FIG. 2, an optical beam 219 is directed along optical path 217 into one end of waveguide 225. In one embodiment, optical beam 219 is directed into waveguide 225 of nonlinearly chirped Bragg grating 201 from an optical transmitter such as for example optical device 103 of FIG. 1. In one embodiment, optical beam 219 includes infrared or near infrared light and is confined with cladding provided by insulating layers 207 and 209 to remain within waveguide 225 along optical path 217. It is appreciated that silicon and polysilicon are partially transparent to infrared or near infrared light. In one embodiment, optical beam 219 corresponds to optical beam 111 of FIG. 1. Optical beam 219 is confined to remain within waveguide 225 as a result of total internal reflection since the oxide material of insulating layers 207 and 209 has a smaller index of refraction than the semiconductor material of semiconductor material 203 and polysilicon 205.

As mentioned above, the spacing between the silicon 203 and polysilicon 205 regions of one embodiment of nonlinearly chirped Bragg grating 201 have nonlinear periodicity. For a chirped Bragg grating, the Bragg condition is a function of position or "z" along nonlinearly chirped Bragg grating 201 and can be expressed as:

$$\lambda_B(z)=2n_{eff}(z)\cdot\Lambda(z), \qquad \text{(Equation 1)}$$

where $\lambda_B(z)$ is the Bragg wavelength, $n_{eff}(z)$ is the effective refractive index and $\Lambda(z)$ is the grating pitch. Accordingly, the periodicity of nonlinearly chirped Bragg grating 201 varies nonlinearly as a function of position along the length of nonlinearly chirped Bragg grating 201 and induces a time delay in the reflected portions of optical beam 219 matching the Bragg condition, or Bragg wavelength $\lambda_B(z)$, which varies nonlinearly with wavelength.

In one embodiment, the reflected portions of optical beam 219 matching the Bragg condition, or Bragg wavelength $\lambda_B(z)$ are directed from waveguide 225 of nonlinearly chirped Bragg grating 201 to an optical receiver, such as for example optical device 107 of FIG. 1. With the above-described induced group delay in the reflected portions of optical beam 219 matching the Bragg condition, chromatic dispersion is introduced into the reflected portions of optical beam 219 by nonlinearly chirped Bragg grating 201. In one embodiment, the induced group delay and chromatic dispersion are tuned to be of opposite sign and substantially equal to the chromatic dispersion introduced by an optical fiber through which optical beam 219 is transmitted. Accordingly, the effects of the chromatic dispersion introduced into optical beam 219 from an optical fiber, such as for example optical fiber 105 of FIG. 1, are substantially minimized or eliminated or negated.

As illustrated in FIG. 2, the spacing between the polysilicon 205 regions of one embodiment of nonlinearly chirped Bragg grating 201 is varied according to the following relationship:

$$d_i = d_0\left[1 + \alpha\left(\frac{i}{N}\right)^2\right], \text{ for } i = 1 \text{ to } N, \quad \text{(Equation 2)}$$

where $d_i$ is the spacing between a particular pair of polysilicon 205 regions, $d_0$ is a reference spacing, $\alpha$ is a waveguide chirp parameter and N is the designed number of polysilicon 205 regions in nonlinearly chirped Bragg grating 201. The embodiment illustrated in FIG. 2 illustrates this nonlinear spacing with the spacing $d_1$, $d_2$, $d_3$, $d_4$ and $d_5$ between the silicon 203 and polysilicon 205 regions in nonlinearly chirped Bragg grating 201. Denoting the complex amplitude reflection coefficient R of nonlinearly chirped Bragg grating 201 by $$R = |R|exp(i\phi), \quad \text{(Equation 3)}$$

the chromatic dispersion D of nonlinearly chirped Bragg grating 201 may be calculated according to $$D(\lambda) = \frac{d\tau}{d\lambda} = \frac{\lambda^2}{2\pi c}\frac{d^2\phi}{d\lambda^2}, \quad \text{(Equation 4)}$$

where $\tau$ is the induced group delay, $\phi$ is the phase and $\lambda$ is the wavelength of reflected optical beam 219.

As can be appreciated from Equation 1 above, the Bragg condition of nonlinearly chirped Bragg grating 201 can be adjusted to tune nonlinearly chirped Bragg grating 201. In the various embodiments of the present invention, the Bragg condition is varied by varying the effective index of refraction $n_{eff}$ to vary the "$2n_{eff}(z)$" term of Equation 1. In the various embodiments of the present invention, the Bragg condition is varied without varying the grating pitch term "$\Lambda(z)$" of Equation 1. Accordingly, no physical or mechanical stretching is necessary to tune nonlinearly chirped Bragg grating 201.

To illustrate, in one embodiment, the Bragg condition of tunable nonlinearly chirped Bragg grating 201 is tuned or adjusted with a heater 211 disposed proximate to waveguide 225. In one embodiment, heater 211 is adjustable and controlled by a control signal $V_{HEAT}$ 216 to control and adjust the temperature of tunable nonlinearly chirped Bragg grating 201. In one embodiment, the temperature along optical path 217 in waveguide 225 is substantially uniform as heater 211 is disposed over substantially all of nonlinearly chirped Bragg grating 201. In one embodiment, heater 211 includes a thin-film heater or the like or other future arising technology that controls the temperature of semiconductor material 203 and polysilicon 205 in waveguide 225 along optical path 217. Silicon and polysilicon have large index of refraction variations with temperature on the order of approximately $2\times10^{-4}/°K$. It is appreciated that the index of refraction variations with temperature for semiconductor materials such as silicon and/or polysilicon are two orders of magnitude greater than other materials such as for example silica or the like, which are used in optical fibers. Thus, by controlling the temperature of semiconductor material 203 and polysilicon 205 with $V_{HEAT}$ 216, relatively significant shifts in the effective index of refraction $n_{eff}$, and therefore, the Bragg condition are provided by nonlinearly chirped Bragg grating 201 in accordance with the teachings of the present invention. In one embodiment, fast electronic tuning in the order of 5–10 ns is realized with a tunable nonlinearly chirped Bragg grating 201 in accordance with the teachings of the present invention.

Figure 4:
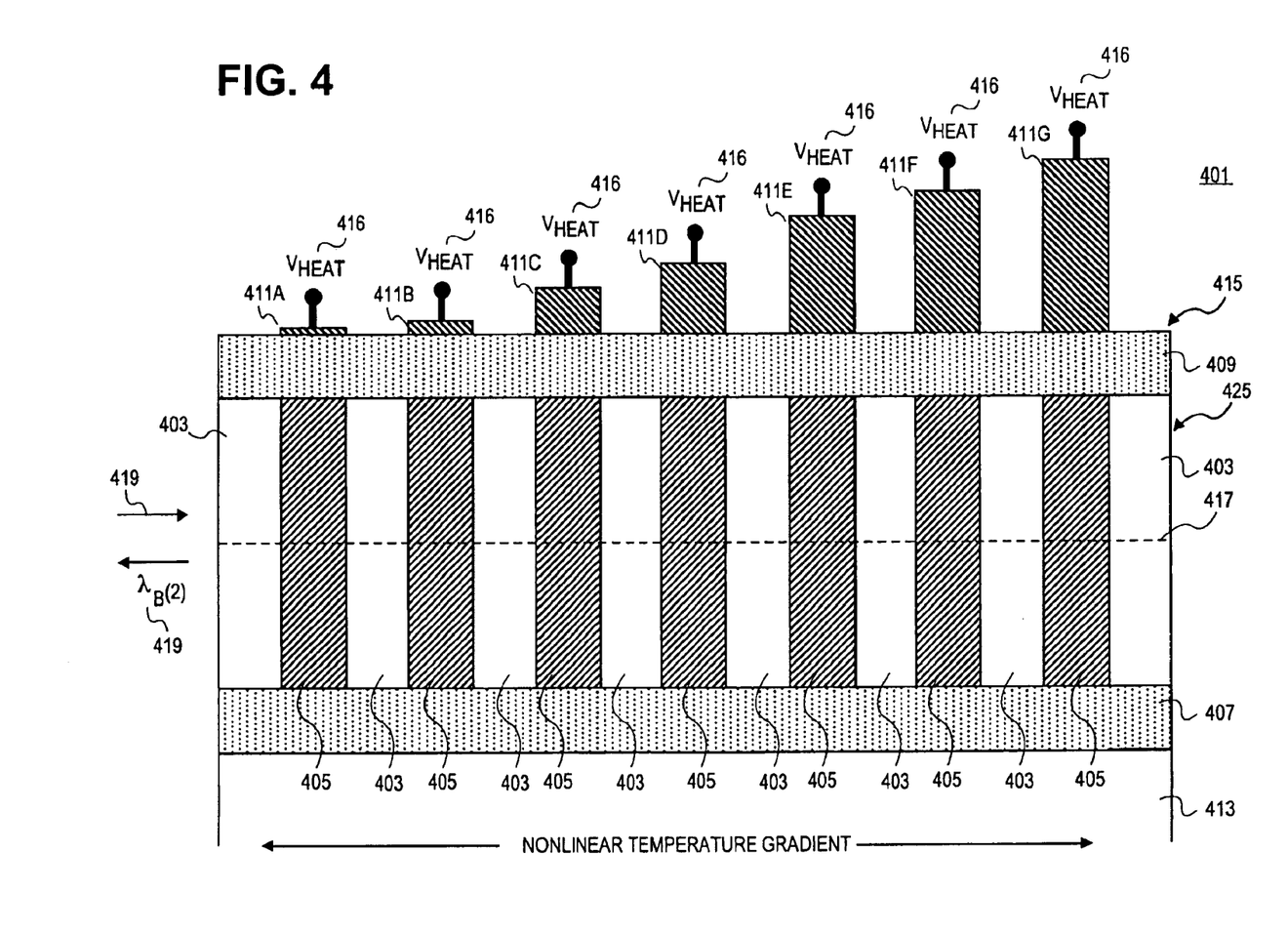
FIG. 4 is a block diagram illustrating a cross section of an embodiment of a nonlinearly chirped Bragg grating having a nonlinear temperature gradient in a semiconductor material of a tunable dispersion compensation device in accordance with the teachings of the present invention.

FIG. 4 is a block diagram illustrating a cross section of an embodiment of a nonlinearly chirped Bragg grating 401 having a nonlinear temperature gradient in a semiconductor material 403 of a tunable dispersion compensation device in accordance with the teachings of the present invention. In one embodiment, nonlinearly chirped Bragg grating 401 is a sampled nonlinearly chirped Bragg grating and may be included in tunable dispersion compensation device 109 of FIG. 1. In the depicted embodiment, nonlinearly chirped Bragg grating 401 of FIG. 4 is silicon-polysilicon grating having substantially uniform spacing. As shown, a plurality of regions of polysilicon 405 are disposed in a silicon semiconductor material 403 such that periodic or quasi-periodic perturbations in an effective index of refraction $n_{eff}$ are provided along an optical path 417 through semiconductor material 403.

Similar to the embodiment of nonlinearly chirped Bragg grating 201 illustrated in FIG. 2, semiconductor material 403 is included in one embodiment an SOI wafer 415. As such, an insulating layer 407 or a buried oxide layer is disposed between semiconductor material 403 layer and another semiconductor material layer 413. In one embodiment, an additional insulating layer 409 is included such that semiconductor material 403 layer is disposed between insulating layers 407 and 409. As a result, a waveguide 425 including optical path 417 is provided in semiconductor material 403 with cladding provided by insulating layers 407 and 409. In one embodiment, waveguide 425 is a rib waveguide, similar to rib waveguide 325 illustrated in FIG. 3.

As shown in the depicted embodiment, nonlinearly chirped Bragg grating 401 includes a plurality of heaters 411A, 411B, 411C, 411D, 411E, 411F and 411G arranged along waveguide 425. It is noted that nonlinearly chirped Bragg grating 401 has been illustrated in FIG. 4 with seven heaters 411A, 411B, 411C, 411D, 411E, 411F and 411G for explanation purposes. It is appreciated that in other embodiments, nonlinearly chirped Bragg grating 401 may include a greater or a fewer number of heaters in accordance with the teachings of the present invention.

In one embodiment, the plurality of heaters have varying dimensions such as for example thickness, height, width, etc., or may be made of different materials to provide a nonlinear temperature gradient along nonlinearly chirped Bragg grating 401, in contrast with the uniform temperature across nonlinearly chirped Bragg grating 201 of FIG. 2. With a nonlinear temperature gradient along an optical path 417 of waveguide 425, a nonlinear effective index of refraction $n_{eff}$ is provided along the optical path 417 of waveguide 425. The nonlinear effective index of refraction $n_{eff}$ along the optical path 417 of waveguide 425 results in a nonlinearly chirped grating. In one embodiment, the Bragg condition is varied by varying the temperature along the optical path 417 of waveguide 425 to vary the effective index of refraction $n_{eff}$, which varies the "$2n_{eff}(z)$" term of Equation 1.

In operation, an optical beam 419 is directed into waveguide 425 and reflected portions of optical beam 419 matching the Bragg condition are reflected. In one embodiment, the optical beam 419 directed into waveguide 425 is received from an optical transmitter and the reflected portions of optical beam 419 matching the Bragg condition are directed from waveguide 425 to an optical receiver. In one embodiment, the induced group delay and chromatic dispersion induced by nonlinearly chirped Bragg grating 401 are tuned to be of opposite sign and substantially equal to the chromatic dispersion introduced by an optical fiber through which optical beam 419 is transmitted. Accordingly, nonlinearly chirped Bragg grating 401 is tuned to substantially minimize or eliminate or negate the effects of the chromatic dispersion introduced into optical beam 419 from an optical fiber, such as for example optical fiber 105 of FIG. 1.

In one embodiment, the plurality of heaters 411A, 411B, 411C, 411D, 411E, 411F and 411G are adjustable and responsive to a control signal $V_{HEAT}$ 416 to adjust the temperature along the optical path 417 of waveguide 425 to tune nonlinearly chirped Bragg grating 401. In another embodiment, each of the plurality of heaters 411A, 411B, 411C, 411D, 411E, 411F and 411G have similar dimensions and a separate control signal $V_{HEAT}$ 416 is applied to each respective heater. In such an embodiment, each of the separate one of the control signals $V_{HEAT}$ 416 are set to values that will result in the plurality of heaters 411A, 411B, 411C, 411D, 411E, 411F and 411G providing a nonlinear temperature gradient along nonlinearly chirped Bragg grating 401.

Figure 5:
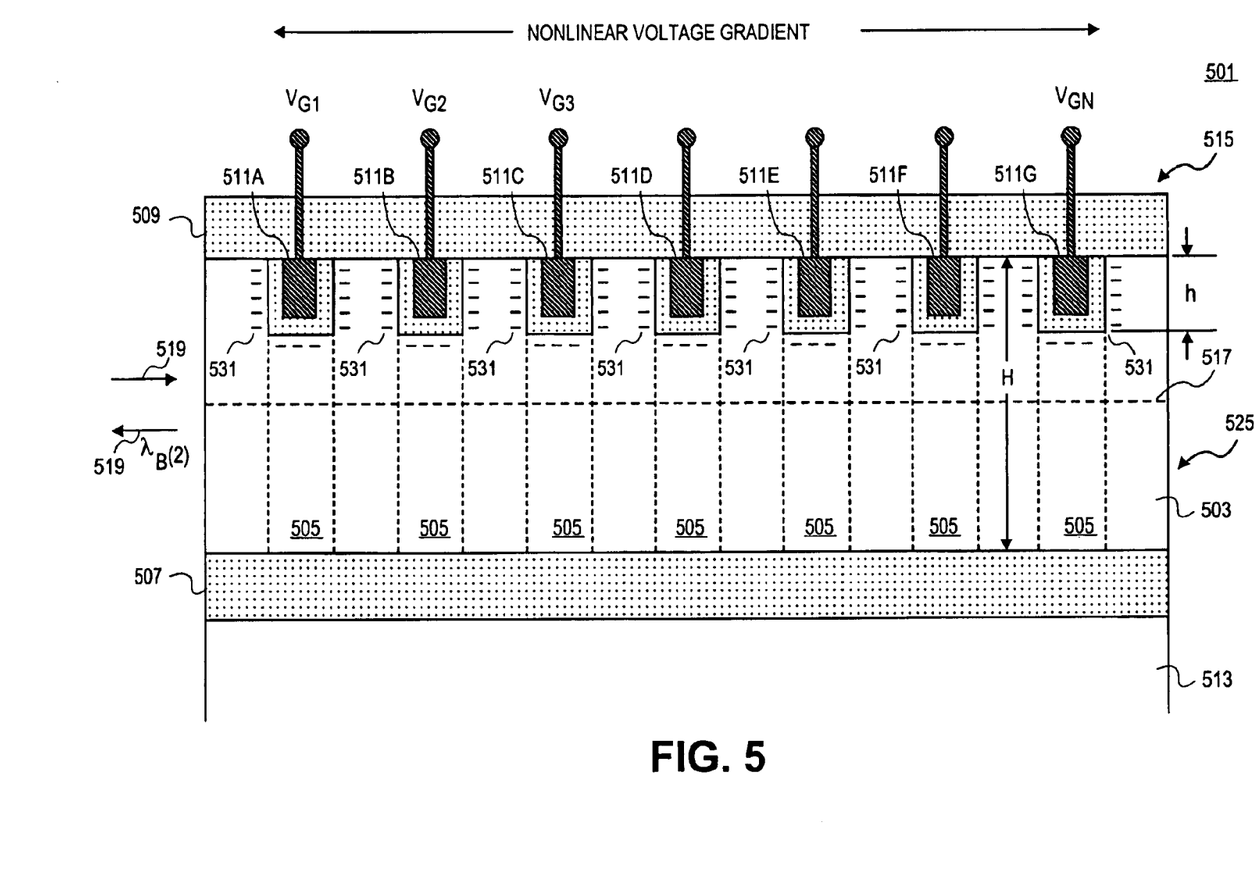
FIG. 5 is a block diagram illustrating a cross section of an embodiment of a nonlinearly chirped Bragg grating having a nonlinear voltage gradient applied to insulated electrodes in a semiconductor material of a tunable dispersion compensation device in accordance with the teachings of the present invention.

FIG. 5 is a block diagram illustrating a cross section of yet another embodiment of a nonlinearly chirped Bragg grating 501 having a nonlinear voltage gradient applied to insulated electrodes 511A, 511B, 51C, 511D, 511E, 511F and 511G along a semiconductor material 503 of a tunable dispersion compensation device in accordance with the teachings of the present invention. In one embodiment, nonlinearly chirped Bragg grating 501 is a sampled nonlinearly chirped Bragg grating and may be included in tunable dispersion compensation device 109 of FIG. 1.

As shown in the depicted embodiment, nonlinearly chirped Bragg grating 501 includes a semiconductor material 503 having an optical path 517 through which an optical beam 519 is directed. In one embodiment, semiconductor material 503 is included in an SOI wafer 515 such that semiconductor material 503 is disposed between a buried insulating layer 507 and insulating layer 509. In addition, buried insulating layer 507 is disposed between semiconductor material layer 503 and semiconductor material layer 513. In one embodiment, an optical waveguide 525 is provided with semiconductor material 503 with insulating layers 507 and 509 serving as cladding to confine optical beam 519 to remain within waveguide 525. In one embodiment, waveguide 525 is a rib waveguide, similar to rib waveguide 525 illustrated in FIG. 3.

As mentioned above, the embodiment depicted in FIG. 5 shows that nonlinearly chirped Bragg grating 501 is provided with a plurality of electrodes insulated electrodes 511A, 511B, 511C, 511D, 511E, 511F and 511G distributed along a semiconductor material 503. Accordingly, a plurality of conductor-insulator-semiconductor structures, similar to, for example, metal-oxide-semiconductor (MOS) structures, are disposed along optical path 517 in semiconductor material 503. It is noted that nonlinearly chirped Bragg grating 501 has been illustrated in FIG. 5 with seven insulated electrodes 511A, 511B, 511C, 511D, 511E, 511F and 511G for explanation purposes. It is appreciated that in other embodiments, nonlinearly chirped Bragg grating 501 may include a greater or a fewer number of insulated electrodes in accordance with the teachings of the present invention.

As shown in the depicted embodiment, insulated electrodes 511A, 511B, 511C, 511D, 511E, 511F and 511G are coupled to receive modulation signals $V_{G1}$, $V_{G2}$, $V_{G3}$ . . . $V_{GN}$, respectively, through insulating layer 509. As shown in FIG. 5, the height of each insulated electrode structures in waveguide 525 is h. In one embodiment, the height h of the structures 515 is chosen such that propagation loss of optical beam 517 in waveguide 525 along optical path 517 is acceptable.

In the embodiment depicted in FIG. 5, periodic or quasi-periodic perturbations in an effective index $n_{eff}$ of refraction are provided along an optical path 517 through waveguide 525 in semiconductor material 503. In the illustrated embodiment, the effective index of refraction $n_{eff}$ is related or equal to a function of the geometry of waveguide 525 along optical path 517 as well as the index of refraction of the specific medium (e.g. $n_{Si}$) and the wavelength or wavelengths λ included in optical beam 519. As shown in FIG. 5, the height of waveguide 525 in the portions not including the insulated electrode structures is H. Accordingly, assuming semiconductor material 503 includes silicon, the effective index of refraction $n_{eff}$ is a function of the height H of waveguide 525 in the portions not including the insulated electrode structures, $n_{Si}$ and λ. In the regions 505 of waveguide 525 including the insulated electrode structures, the effective index of refraction $n'_{eff}$ is a function of the height (H–h) of waveguide 525, $n_{Si}$ and λ. Thus, the difference in effective index of refraction $$\Delta n_{eff} = n_{eff} - n'_{eff}.$$  (Equation 5)

In the depicted embodiment, insulated electrodes 511A, 511B, 511C, 511D, 511E, 511F and 511G are biased in response to modulation signals $V_{G1}$, $V_{G2}$, $V_{G3}$ . . . $V_{GN}$, respectively. Thus, there is an increased concentration of free charge carriers in charge modulated regions 531 in the semiconductor material layer 503 proximate to insulated electrode structures 511A, 511B, 511C, 511D, 511E, 511F and 511G. For example, assuming a positive voltage is applied with modulation signals $V_{G1}$, $V_{G2}$, $V_{G3}$ . . . $V_{GN}$, electrons in semiconductor material 503 are swept into charge-modulated regions 531. When for example less positive voltage is applied to insulated electrode structures 511A, 511B, 511C, 511D, 511E, 511F and 511G, the concentration of free charge carriers swept into charge-modulated regions 531 is reduced.

It is noted that for explanation purposes, charge modulated regions 531 have been illustrated to include electrons or negative charge. It is appreciated that in another embodiment, the polarities of these charges and the voltages of modulation signals $V_{G1}$, $V_{G2}$, $V_{G3}$ . . . $V_{GN}$ may be reversed. Thus, in such an embodiment, holes or positive charge carriers are swept into charge-modulated regions 531 in accordance with the teachings of the present invention.

In one embodiment, the effective index of refraction $n_{eff}$ in charge-modulated regions 531 is modulated in response to modulation signals $V_{G1}$, $V_{G2}$, $V_{G3}$ . . . $V_{GN}$ due to the plasma optical effect. The plasma optical effect arises due to an interaction between the optical electric field vector and free charge carriers that may be present along the optical path 517 of the optical beam 519. The electric field of the optical beam 519 polarizes the free charge carriers and this effectively perturbs the local dielectric constant of the medium. This in turn leads to a perturbation of the propagation velocity of the optical wave and hence the refractive index for the light, since the refractive index is simply the ratio of the speed of the light in vacuum to that in the medium. The free charge carriers are accelerated by the electric field, and also lead to absorption of the optical field as optical energy is used up. Generally the refractive index perturbation is a complex number with the real part is related to the group velocity change and the imaginary part is related to the free charge carrier absorption. In the case of the plasma optical effect in silicon, the effective change in the index of refraction $\Delta n_{eff}$ due to the free electron ($\Delta N_e$) and hole ($\Delta N_h$) concentration change is given by:

$$\Delta n_{\it eff} = -\frac{e^2\lambda^2}{8\pi^2c^2\varepsilon_0n_0}\left(\frac{\Delta N_e}{m_e^*} + \frac{\Delta N_h}{m_h^*}\right) \qquad \text{(Equation 6)}$$

where $n_0$ is the nominal index of refraction for silicon, e is the electronic charge, c is the speed of light, $\varepsilon_0$ is the permittivity of free space, $m_e^*$ and $m_h^*$ are the electron and hole effective masses, respectively.

In one embodiment, the concentration of free charge carriers swept into each of the charge modulated regions 531 is responsive to the voltages of modulation signals $V_{G1}$, $V_{G2}$, $V_{G3}$ ... $V_{GN}$. Accordingly, the effective index of refraction flef provided along optical path 517 through semiconductor material 503 is responsive to modulation signals $V_{G1}$, $V_{G2}$, $V_{G3}$ ... $V_{GN}$. In one embodiment, the voltages of modulation signals $V_{G1}$, $V_{G2}$, $V_{G3}$ ... $V_{GN}$ that are applied across the insulated electrodes 511A, 511B, 511C, 511D, 511E, 511F and 511G along waveguide 525 have a nonlinear voltage gradient. Thus, the concentration of free charge carriers swept into each of the charge-modulated regions 531 is varies nonlinearly along waveguide 525. Accordingly, the Bragg grating formed in waveguide 525 is therefore nonlinearly chirped in accordance with the teachings of the present invention.

In operation, an optical beam 519 is directed into waveguide 525 and reflected portions of optical beam 519 matching the Bragg condition are reflected. In one embodiment, the optical beam 519 directed into waveguide 525 is received from an optical transmitter and the reflected portions of optical beam 519 matching the Bragg condition are directed to an optical receiver. In one embodiment, the induced group delay or chromatic dispersion induced by nonlinearly chirped Bragg grating 501 is tuned to substantially negate or reduce the effects of chromatic dispersion introduced into optical beam 519 by an optical fiber.

In one embodiment, the voltages of modulation signals $V_{G1}$, $V_{G2}$, $V_{G3}$ ... $V_{GN}$ that are applied across the insulated electrodes 511A, 511B, 511C, 511D, 511E, 511F and 511G are adjusted to tune nonlinearly chirped Bragg grating 501. In one embodiment, it is appreciated that relatively low voltages are utilized for modulation signals $V_{G1}$, $V_{G2}$, $V_{G3}$ ... $V_{GN}$. For instance, voltages in the range of for example 5 to 15 volts are used for modulation signals $V_{G1}$, $V_{G2}$, $V_{G3}$ ... $V_{GN}$ in one embodiment.

In another embodiment, the spacing between each of the insulated electrodes 511A, 511B, 511C, 511D, 511E, 511F and 511G along waveguide 525 is varied such that the spacing between each of the insulated electrodes has nonlinear periodicity. In such an embodiment, each of the modulation signals $V_{G1}$, $V_{G2}$, $V_{G3}$ ... $V_{GN}$ may have similar or uniform voltages since nonlinear chirping of the Bragg grating in waveguide 525 will be realized by the nonlinear spacing between insulated electrodes 511A, 511B, 511C, 511D, 511E, 511F and 511G.

Figure 6:
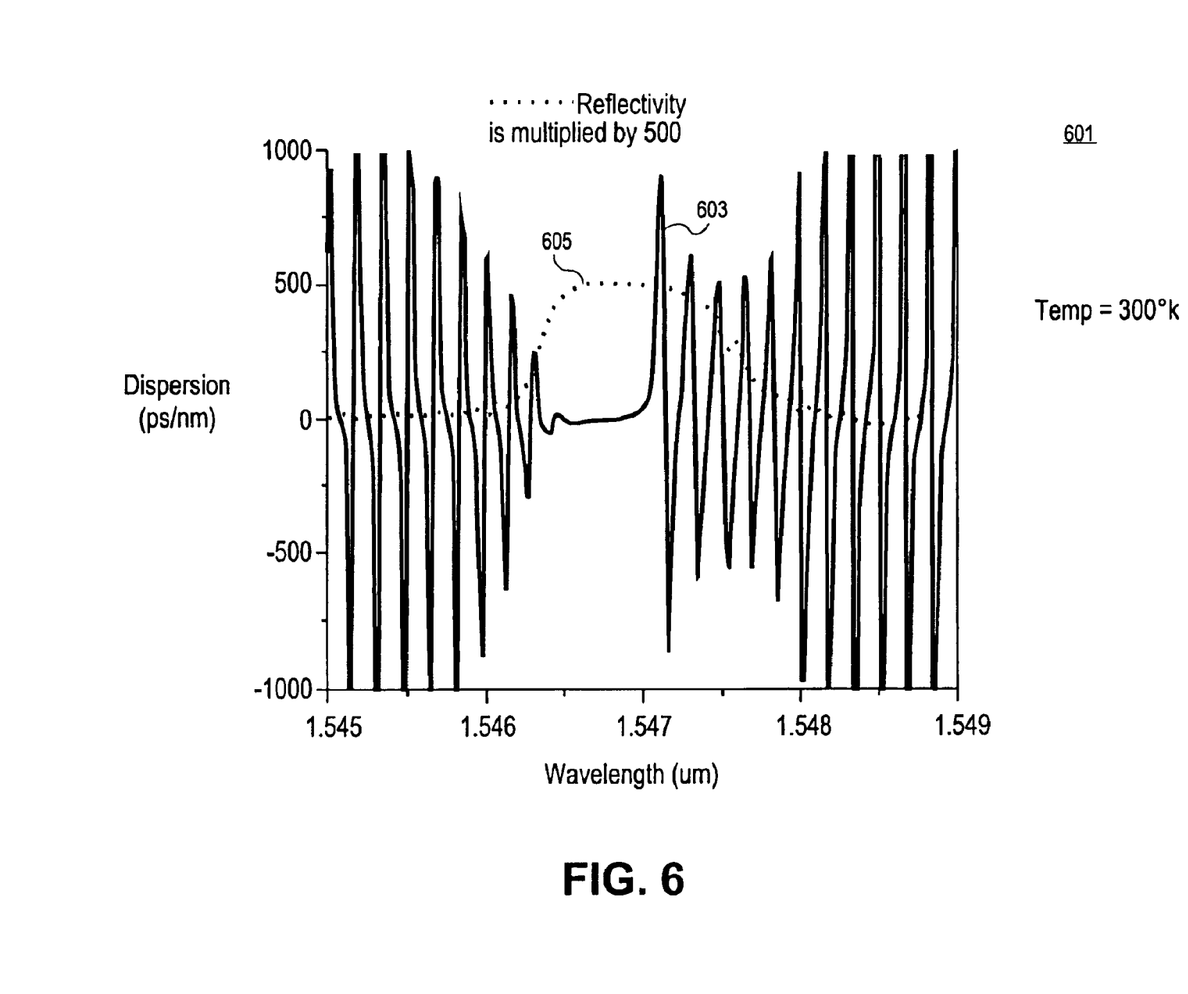
FIG. 6 is a diagram illustrating the relationship between dispersion and wavelength as well as reflectivity and wavelength of an embodiment a tunable dispersion compensation device in accordance with the teachings of the present invention.

FIG. 6 is a diagram 601 illustrating the relationship between the chromatic dispersion D and optical wavelength $\lambda$ as well as reflectivity R and optical wavelength $\lambda$ of a tunable dispersion compensation device in accordance with the teachings of the present invention. In the illustrated example, diagram 601 includes plot 603, which shows the chromatic dispersion of one embodiment of a nonlinearly chirped Bragg grating at a temperature of 300° K. for a value of $\alpha=0.001$ and the index difference between crystalline silicon and polysilicon of $\Delta n=0.02$ versus the wavelength of an optical beam. Plot 605 shows the reflection spectrum or reflectivity multiplied by 500 of one embodiment of a nonlinearly chirped Bragg grating versus the wavelength of an optical beam.

As can be appreciated from FIG. 6, plots 603 and 605 show that chromatic dispersion as high as 1000 ps/nm is generated by one embodiment of a nonlinearly chirped Bragg grating with a relatively small reflectivity loss (<3 dB). As also can be appreciated from FIG. 6, dispersion compensation can be provided simultaneously to multiple wavelengths included in an optical beam as plot 603 shows that there are multiple peaks in dispersion at various wavelengths. In one embodiment, plots 603 and 605 can be shifted to different wavelengths to tune or adjust the tunable dispersion compensation system by changing the temperature in accordance with the teachings of the present invention. Thus, particular wavelengths or channels in an optical beam can be selected for dispersion compensation and an embodiment of a tunable dispersion compensation device can be tuned accordingly based on the selected wavelength or wavelengths.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An apparatus, comprising:
a semiconductor material;
an optical path through the semiconductor material, the optical path optically coupled to receive an optical beam, the optical beam including one or more wavelengths; and
a nonlinearly chirped Bragg grating disposed in the semiconductor material, the optical path including the nonlinearly chirped Bragg grating to substantially reduce chromatic dispersion in the optical beam, the nonlinearly chirped Bragg grating including regions of silicon and polysilicon disposed in the semiconductor material along the optical path to provide a plurality of perturbations of a refractive index along the optical path.

2. The apparatus of claim 1 wherein the regions of silicon and polysilicon are disposed in the semiconductor material with a nonlinear periodicity along the optical path.

3. The apparatus of claim 2 further comprising an adjustable heater disposed proximate to the nonlinearly chirped Bragg grating to adjust a temperature along the nonlinearly chirped Bragg grating, wherein an effective index of refraction along the optical path is responsive to the temperature along the nonlinearly chirped Bragg grating.

4. The apparatus of claim 1 wherein the regions of silicon and polysilicon are periodically disposed in the semiconductor material along the optical path, the apparatus further including a plurality of adjustable heaters disposed proximate to the nonlinearly chirped Bragg grating to adjust a nonlinear temperature gradient in the semiconductor material along the optical path, wherein an effective index of refraction along the optical path is responsive to the nonlinear temperature gradient along the nonlinearly chirped Bragg grating.

5. The apparatus of claim 1 further comprising a waveguide disposed in the semiconductor material, the waveguide including the optical path and the nonlinearly chirped Bragg grating.

6. The apparatus of claim 5 wherein the waveguide comprises a rib waveguide disposed in the semiconductor material.

7. The apparatus of claim 1 wherein the optical beam includes said one or more optical channels centered in wavelength bands located at approximately 1310 or 1550 nanometers.

8. A method, comprising:
directing an optical beam through a semiconductor material and to a nonlinearly chirped Bragg grating disposed in the semiconductor material;
reflecting portions of the optical beam matching a Bragg condition of the nonlinearly chirped Bragg grating to provide a first chromatic dispersion to the optical beam; and
adjusting the Bragg condition of the nonlinearly chirped Bragg grating to adjust the first chromatic dispersion provided to the optical beam, the Bragg condition adjusted by adjusting a temperature of the nonlinearly chirped Bragg grating.

9. The method of claim 8 further comprising substantially negating effects of a second chromatic dispersion introduced to the optical beam, wherein said first chromatic dispersion is of opposite sign and substantially equal to said second chromatic dispersion, said negating effects of said second chromatic dispersion introduced to the optical beam comprising said reflecting portions of the optical beam matching the Bragg condition of the nonlinearly chirped Bragg grating.

10. The method of claim 8 wherein said adjusting the Bragg condition of the nonlinearly chirped Bragg grating comprises adjusting an effective refractive index in the semiconductor material along an optical path of the nonlinearly chirped Bragg grating.

11. The method of claim 8 wherein said adjusting the temperature of the nonlinearly chirped Bragg grating includes adjusting the temperature of the semiconductor material to have a nonlinear temperature gradient along the optical path of the nonlinearly chirped Bragg grating.

12. The method of claim 8 wherein said adjusting the temperature of the semiconductor material including the nonlinearly chirped Bragg grating includes adjusting the temperature of the semiconductor material to have a uniform temperature along the optical path of the nonlinearly chirped Bragg grating, the nonlinearly chirped Bragg grating including regions of silicon and polysilicon disposed in the semiconductor material with nonlinear periodicity along the optical path of the nonlinearly chirped Bragg grating.

13. The method of claim 9 wherein the optical beam includes a plurality wavelengths, wherein said negating the effects of the second chromatic dispersion introduced to the optical beam comprises negating the effects of the second chromatic dispersion introduced to each of the plurality of wavelengths included in the optical beam.

14. The method of claim 8 wherein the optical beam includes a plurality wavelengths, the method further comprising selecting at least one of the plurality of wavelengths to negate the effects of the second chromatic dispersion introduced to the selected wavelength included in the optical beam, wherein the adjusting of the Bragg condition of the nonlinearly chirped Bragg grating is in response to the selected wavelength included in the optical beam.

15. The method of claim 9 wherein the effects of the second chromatic dispersion in the optical beam are introduced prior to said directing the optical beam through the semiconductor material and to the nonlinearly chirped Bragg grating disposed in the semiconductor material.

16. The method of claim 9 wherein the effects of the second chromatic dispersion in the optical beam are introduced after said directing the optical beam through the semiconductor material and to the nonlinearly chirped Bragg grating disposed in the semiconductor material.

17. A system, comprising:
a first optical device to transmit an optical beam;
a second optical device optically coupled to receive the optical beam from the first optical device; and
a tunable dispersion compensation device optically coupled between the first and second optical devices, the optical beam directed from the first optical device through an optical fiber and to the tunable chromatic dispersion compensation device to the second optical device, the tunable dispersion compensation device including:
a semiconductor material;
an optical path through the semiconductor material, the optical path optically coupled to receive the optical beam; and
a nonlinearly chirped Bragg grating disposed in the semiconductor material along the optical path, the nonlinearly chirped Bragg grating having a tunable Bragg condition, the nonlinearly chirped Bragg grating optically coupled to reflect the optical beam with reduced chromatic dispersion in the reflected optical beam.

18. The system of claim 17 wherein the regions of silicon and polysilicon are disposed in the semiconductor material with a nonlinear periodicity along the optical path.

19. A system, comprising:
a first optical device to transmit an optical beam;
a second optical device optically coupled to receive the optical beam from the first optical device; and
a tunable dispersion compensation device optically coupled between the first and second optical devices, the optical beam directed from the first optical device through an optical fiber and to the tunable chromatic dispersion compensation device to the second optical device, the tunable dispersion compensation device including:
a semiconductor material;
an optical path through the semiconductor material, the optical path optically coupled to receive the optical beam; and
a plurality of charge modulated regions disposed in the semiconductor material along the optical path, the plurality of charge modulated regions provided with a plurality of insulated electrodes distributed along the optical path to form a nonlinearly chirped Bragg grating having a tunable Bragg condition, the nonlinearly chirped Bragg grating optically coupled to reflect the optical beam with reduced chromatic dispersion in the reflected optical beam.

20. The system of claim 19 wherein adjustable voltages are coupled across the plurality of insulated electrodes with a nonlinear voltage gradient across the plurality of insulated electrodes.

21. The system of claim 19 wherein adjustable voltages are coupled across the plurality of insulated electrodes and wherein the plurality of insulated electrodes are distributed in the semiconductor material along the optical path with nonlinear periodicity.

22. An apparatus, comprising:
a semiconductor material;
an optical path through the semiconductor material, the optical path optically coupled to receive an optical beam, the optical beam including one or more wavelengths; and
a nonlinearly chirped Bragg grating disposed in the semiconductor material, the optical path including the nonlinearly chirped Bragg grating to substantially reduce chromatic dispersion in the optical beam, the nonlinearly chirped Bragg grating including a plurality of charge-modulated regions disposed in the semiconductor material along the optical path to provide a plurality of perturbations of a refractive index along the optical path.

23. The apparatus of claim 22 wherein the plurality of charge modulated regions are provided with a plurality of insulated electrodes distributed along the optical path.

24. The apparatus of claim 23 wherein adjustable voltages are coupled across the plurality of insulated electrodes with a nonlinear voltage gradient across the plurality of insulated electrodes.

25. The apparatus of claim 23 wherein an effective index of refraction along the optical path is responsive to adjustable voltages coupled across the plurality of insulated electrodes.

26. The apparatus of claim 23 wherein spacing between the plurality of insulated electrodes in the semiconductor material along the optical path has nonlinear periodicity.

27. A method, comprising:
    directing an optical beam through a semiconductor material and to a nonlinearly chirped Bragg grating disposed in the semiconductor material;
    reflecting portions of the optical beam matching a Bragg condition of the nonlinearly chirped Bragg grating to provide a first chromatic dispersion to the optical beam; and
    adjusting the Bragg condition of the nonlinearly chirped Bragg grating to adjust the first chromatic dispersion provided to the optical beam, the Bragg condition adjusted by adjusting a concentration of charge in each of a plurality of charge modulated regions disposed in the semiconductor material along an optical path.

28. The method of claim 27 wherein the plurality of charge modulated regions are provided with a plurality of insulated electrodes distributed along the optical path.

29. The method of claim 28 wherein said adjusting the Bragg condition of the nonlinearly chirped Bragg grating includes adjusting an effective refractive index in the semiconductor material along the optical path of the nonlinearly chirped Bragg grating.

30. The method of claim 29 wherein said adjusting the concentration of charge in each of the plurality of charge modulated regions in the semiconductor material along the optical path includes coupling adjustable voltages across the plurality of insulated electrodes with a nonlinear voltage gradient across the plurality of insulated electrodes.

31. The method of claim 29 wherein said adjusting the concentration of charge in each of the plurality of charge modulated regions in the semiconductor material along the optical path includes coupling adjustable voltages across the plurality of insulated electrodes with a uniform voltage across the plurality of insulated electrodes, the plurality of insulated electrodes distributed in the semiconductor material along the optical path with nonlinear periodicity.

* * * * *

UNITED STATES PATENT AND TRADEMARK OFFICE
CERTIFICATE OF CORRECTION

PATENT NO.   : 6,888,986 B2
DATED        : May 3, 2005
INVENTOR(S)  : Ovadia et al.

It is certified that error appears in the above-identified patent and that said Letters Patent is hereby corrected as shown below:

Column 11,
Line 13, delete "flef" and insert -- $n_{eff}$ --.

Column 14,
Line 16, after "grating", insert -- including regions of silicon and polysilicon --.

Signed and Sealed this

Nineteenth Day of July, 2005

JON W. DUDAS
*Director of the United States Patent and Trademark Office*